(12) United States Patent
Ahnfalk

(10) Patent No.: US 9,505,360 B2
(45) Date of Patent: Nov. 29, 2016

(54) METHOD AND ARRANGEMENT FOR IMPROVING THE PERFORMANCE OF A SAFETY-CRITICAL VEHICLE ACTUATOR

(75) Inventor: Henrik Ahnfalk, Kungsbacka (SE)

(73) Assignee: Volvo Car Corporation, Gothenburg (SE)

( * ) Notice: Subject to any disclaimer, the term of this patent is extended or adjusted under 35 U.S.C. 154(b) by 990 days.

(21) Appl. No.: 13/527,229

(22) Filed: Jun. 19, 2012

(65) Prior Publication Data

US 2012/0326676 A1    Dec. 27, 2012

(30) Foreign Application Priority Data

Jun. 22, 2011  (EP) ..................................... 11170875

(51) Int. Cl.
| | | |
|---|---|---|
| *B60L 1/00* | (2006.01) | |
| *B60L 3/00* | (2006.01) | |
| *H02G 3/00* | (2006.01) | |
| *B60R 16/03* | (2006.01) | |

(52) U.S. Cl.
CPC ..................... *B60R 16/03* (2013.01)

(58) Field of Classification Search
CPC ...................................................... B60R 16/03
USPC .................................. 307/9.1, 10.1
See application file for complete search history.

(56) References Cited

U.S. PATENT DOCUMENTS

| | | | |
|---|---|---|---|
| 5,512,789 A * | 4/1996 | Lyon ............................. 307/10.1 |
| 5,646,849 A * | 7/1997 | Walenty et al. ................ 701/70 |
| 6,100,797 A | 8/2000 | Mattes et al. | |
| 6,227,626 B1 * | 5/2001 | Blattert ............................ 303/20 |
| 6,410,993 B1 * | 6/2002 | Giers ........................... 307/10.1 |
| 7,215,034 B2 * | 5/2007 | Hino ....................... B60R 16/03 |
| | | | 180/65.1 |
| 7,778,753 B2 * | 8/2010 | Fujiwara et al. ................ 701/41 |
| 8,008,791 B2 * | 8/2011 | Yamakado et al. ........... 290/4 C |
| 8,577,531 B2 * | 11/2013 | Semsey et al. .................. 701/22 |
| 2002/0158511 A1 * | 10/2002 | Baumgartner et al. ........ 303/199 |
| 2003/0030322 A1 * | 2/2003 | Yokoyama et al. ...... 303/122.04 |
| 2004/0019423 A1 * | 1/2004 | Yasui et al. ..................... 701/71 |
| 2004/0148075 A1 * | 7/2004 | Bullister et al. ................ 701/41 |
| 2004/0155811 A1 * | 8/2004 | Albero et al. ................... 342/70 |
| 2004/0160122 A1 * | 8/2004 | Yokoyama et al. ........... 307/9.1 |
| 2006/0097577 A1 * | 5/2006 | Kato et al. .................... 307/10.1 |
| 2006/0113138 A1 | 6/2006 | Maron | |
| 2007/0138861 A1 * | 6/2007 | Kawahara et al. .............. 303/20 |

(Continued)

FOREIGN PATENT DOCUMENTS

| | | |
|---|---|---|
| DE | 102006038675 A1 | 3/2008 |
| EP | 1515490 A1 | 3/2005 |

(Continued)

OTHER PUBLICATIONS

Extended European Search Report Dated Dec. 6, 2011, Application No. 11170875.6-1523, Applicant Volvo Car Corporation. 5 Pages.

(Continued)

*Primary Examiner* — Carlos Amaya
(74) *Attorney, Agent, or Firm* — Brooks Kushman P.C.

(57) ABSTRACT

Embodiments herein relate to an arrangement and method for improving the performance of a safety-critical vehicle actuator, in particular a safety-critical vehicle actuator powered directly or indirectly from a vehicle electrical system. The safety-critical vehicle actuator is arranged to, upon activation thereof, signal to an alternator of the vehicle to output a raised voltage for a pre-determined time period.

20 Claims, 2 Drawing Sheets

(56) References Cited

U.S. PATENT DOCUMENTS

| | | | |
|---|---|---|---|
| 2009/0152880 A1* | 6/2009 | Donovan | 293/4 |
| 2009/0179627 A1* | 7/2009 | Innami et al. | 323/318 |
| 2009/0189570 A1* | 7/2009 | Abe | B60R 16/0232 320/162 |
| 2010/0033008 A1* | 2/2010 | Sabelstrom et al. | 303/125 |
| 2010/0105520 A1* | 4/2010 | Ohbayashi et al. | 477/23 |
| 2012/0116618 A1* | 5/2012 | Tate et al. | 701/22 |
| 2012/0158245 A1* | 6/2012 | Yoshizawa et al. | 701/36 |

FOREIGN PATENT DOCUMENTS

| | | | |
|---|---|---|---|
| EP | 1950121 | A2 | 7/2008 |
| EP | 2145798 | A2 | 1/2010 |
| JP | 2001507311 | A | 6/2001 |
| WO | 03099633 | A1 | 12/2003 |

OTHER PUBLICATIONS

Chinese Second Office Action Dated Jan. 26, 2016, Application No. 201210073248.1, 7 Pages.

Chinese First Office Action Dated Aug. 24, 2015, Application No. 201210073248.1, 6 Pages.

\* cited by examiner

METHOD AND ARRANGEMENT FOR IMPROVING THE PERFORMANCE OF A SAFETY-CRITICAL VEHICLE ACTUATOR

CROSS-REFERENCE TO RELATED APPLICATIONS

This application claims foreign priority benefits under 35 U.S.C. §119(a)-(d) to EP 11170875.6, filed Jun. 22, 2011, the disclosure of which is hereby incorporated by reference in its entirety.

TECHNICAL FIELD

The present disclosure relates to an arrangement for improving the performance of a safety-critical vehicle actuator. In particular, they relate to an arrangement for improving the performance of a safety-critical vehicle actuator powered directly or indirectly from the vehicle electrical system.

Embodiments herein further relate to a method for improving the performance of a safety-critical vehicle actuator. In particular they relate to a method for improving the performance of a safety-critical vehicle actuator powered directly or indirectly from the vehicle electrical system.

BACKGROUND

In order to safeguard the performance of safety-relevant electrical equipment in vehicles it is known to disconnect non-critical electrical consumers from the vehicle electrical system upon activation of the safety-relevant electrical consumers.

Previously known WO03099633 relates to a dynamic, safety-relevant high-current consumer in a motor vehicle electrical system. Examples of such safety-relevant, high-current consumers are electro-mechanical braking systems or steering systems. The consumer comprises sensor equipment for sensing an input variable, a locally situated control unit for generating a control signal and an actuator for converting said control signal into an output variable. A device for sensing the voltage condition of the vehicle's electrical system is associated with the high-current consumer and the data of that device is made available to the control unit. The control unit adapts the parameters of the actuator during the generation of the control signal, so as to prevent a voltage dip in the voltage of the vehicle electrical system.

WO03099633 discloses that it is desirable to prevent a voltage dip in the voltage of a vehicle electrical system in order to ensure operation of a safety-relevant high-current consumer in the motor vehicle electrical system. However, as this is achieved through adapting the parameters of the actuator the performance of such an actuator may normally not be used to its fullest potential.

SUMMARY

Embodiments herein aim to provide an improved arrangement for improving the performance of a safety-critical vehicle actuator, in particular a safety-critical vehicle actuator powered directly or indirectly from a vehicle electrical system.

This is provided by an arrangement for improving the performance of a safety-critical vehicle actuator wherein the safety-critical vehicle actuator, upon activation thereof, is arranged to signal to an alternator of the vehicle to output a raised voltage for a pre-determined time period.

The provision of a raised voltage output from the vehicle alternator provides for improved and stable performance of the safety-critical actuator which increases the safety of the vehicle driver and passengers. It also enables the use of components, such as electrically powered hydraulic pumps, of lesser dimensions then otherwise would be possible, which provides for a reduction of weight as well as cost.

According to a second aspect the alternator is arranged to output the raised voltage within 300 milliseconds from receipt of said signal.

The rapid response, as described for the second aspect, provides for e.g., hydraulic pressure in a hybrid hydraulic/electrical braking system to be built up early during the braking process, in order for the safety-critical vehicle actuators be able to benefit from the higher voltage during their operation.

According to a third aspect the alternator is arranged to output a voltage of approximately 15 volts for the pre-determined time period.

A voltage of approximately 15 volts, as described for the third aspect, has been found to provide for a shorter stopping distance in a hybrid hydraulic/electrical braking system of a vehicle having an ordinary so called 12 volts electrical system.

According to a fourth aspect the safety-critical actuator is either of an at least partially electrically operated vehicle braking system or vehicle steering system.

Fully or partially electrically operated vehicle braking systems or vehicle steering systems, as described for the fourth aspect, have been found to have significantly improved performance if the voltage is raised as proposed herein rendering both shorter braking distances, faster steering response and the ability to reduce both weight and cost of components of these systems.

According to a fifth aspect the arrangement is responsive to activation of the safety-critical actuator by a vehicle mounted forward collision avoidance system.

According to a sixth aspect the vehicle mounted forward collision avoidance system further is arranged to trigger signaling to the alternator in response to a predicted threat potentially requiring imminent activation of the safety-critical actuator.

According to a seventh aspect the vehicle mounted forward collision avoidance system further is arranged to trigger a warning to a driver of the vehicle to activate the safety-critical actuator.

The integration with a vehicle mounted forward collision avoidance system, as described for the fifth, sixth and seventh aspects, enables improved performance for autonomous activation of safety-critical actuators in similar way as described above. Furthermore, triggering signaling to the alternator in response to a predicted threat further increases the responsiveness of the arrangement for ensuring the availability of the raised voltage to the safety-critical actuator.

Further, embodiments herein aim to provide an improved method for improving the performance of a safety-critical vehicle actuator, in particular a safety-critical vehicle actuator powered directly or indirectly from a vehicle electrical system.

This is provided by a method for improving the performance of a safety-critical vehicle actuator which comprises the step of: arranging the safety-critical vehicle actuator to, upon activation thereof, signal to an alternator of the vehicle to output a raised voltage for a pre-determined time period.

The method provides for the same advantages as described above for aspects of the arrangement.

In the following, embodiments herein will be described in greater detail by way of example only with reference to the below drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
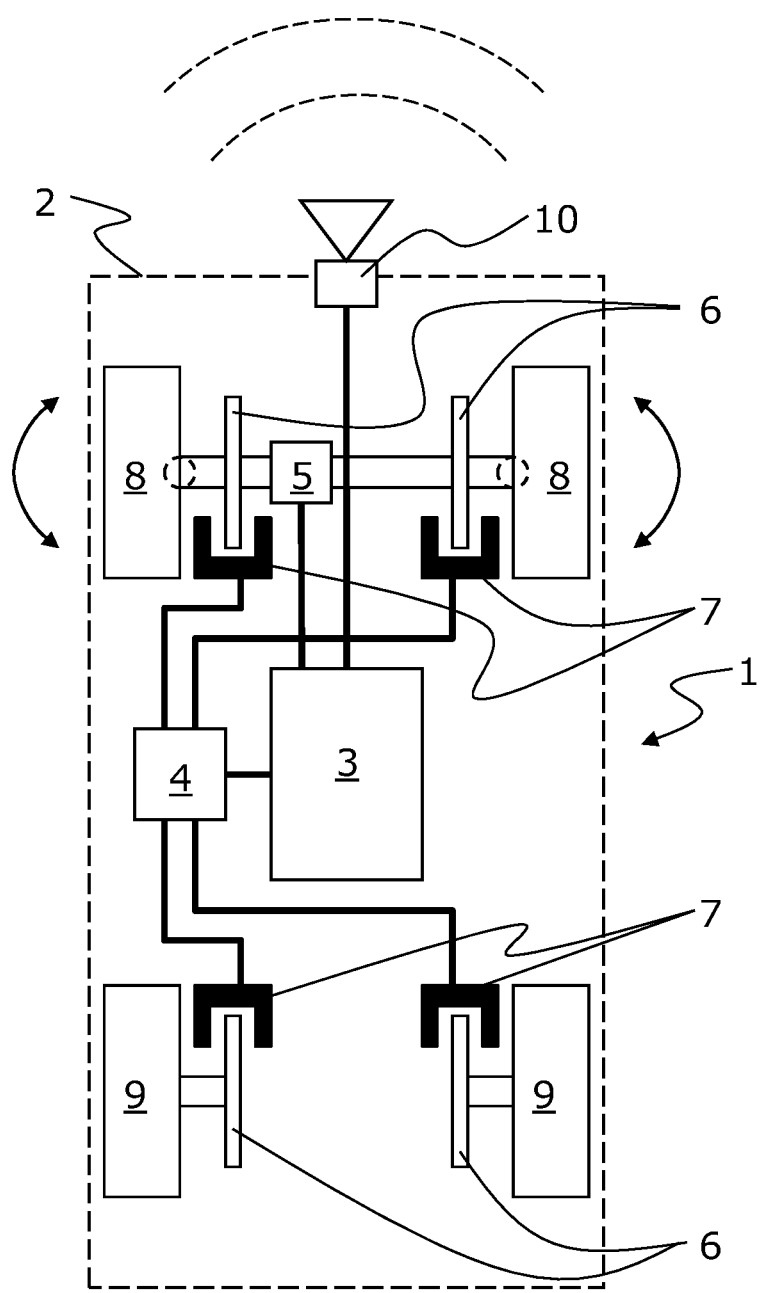
FIG. 1 is a schematic illustration of one embodiment of an arrangement for improving the performance of a safety-critical vehicle actuator in accordance with the present application.

In overview, embodiments herein, as shown schematically in FIG. 1, relate to an arrangement 1 for improving the performance of a safety-critical vehicle actuator which is arranged in a host vehicle 2 where the safety-critical vehicle actuator is powered directly or indirectly by the vehicle electrical system.

The safety-critical vehicle actuator may be part of a host vehicle 2 braking system 4, such as an anti-lock braking system or ABS system, e.g., with brake discs 6 and appertaining calipers 7 associated with each of the front wheels 8 and rear wheels 9. The braking system 4 may be a hybrid between a hydraulic and an electrical braking system 4. The safety-critical vehicle actuator may be part of a power steering system 5, which is arranged to control the steering angle of the front wheels 8. The power steering system 5 may likewise be a hybrid between a hydraulic and an electrical power steering system 5.

In accordance with a first embodiment, the arrangement 1 for improving the performance of a safety-critical vehicle actuator 4, 5 is configured such that the safety-critical vehicle actuator 4, 5, upon activation thereof, is arranged to signal to an alternator 3 of the vehicle to output a raised voltage for a pre-determined time period. The alternator 1 of the vehicle is normally associated with an internal combustion engine (not shown) of the vehicle. The pre-determined time period may correspond to an anticipated or predicted time-period required for performing the requisite actuation of the safety-critical vehicle actuator 4, 5 and may thus vary according to the particular requirements at the time of activation.

The functionality may be implemented in safety-critical vehicle actuators 4, 5 which may require or which may display an improved performance if the voltage fed thereto is raised. Thus, the safety-critical vehicle actuator 4, 5 generates a signal which is signaled to the alternator 3, e.g., that a maximum voltage is required during a certain time period. It is crucial that this is performed rapidly as the functionalities which may require improved or maintained performance will usually only become aware of this need just as the need arises. In the case of e.g., a hybrid hydraulic/electrical braking system 4, it is crucial to build hydraulic pressure early during the braking process, preferably during the initial 300 milliseconds thereof. Thus, the alternator 3 response needs to be fast in order for any safety-critical vehicle actuator 4, 5 to be able to benefit from the higher voltage during its operation. Therefore, in a further embodiment the alternator 3 is arranged to output the raised voltage within 300 milliseconds from receipt of said signal.

In case of a hybrid hydraulic/electrical brake or steering systems 4, 5, rapid rising of the voltage to a high and stable level enables use of a smaller electrical pump motor (not shown) whereby cost may also be reduced.

Verifying tests have shown that where the braking system 4 is an ABS braking system, ABS-pump activated braking is dependent on vehicle system voltage. A higher voltage results in a shorter stopping distance. If the voltage is not controlled to a desired level, from a brake performance point of view, then an electrical pump specification must be higher with a higher product cost as a consequence. This is also true for other safety critical actuators, such as an electrical power steering actuator.

The arrangement 1 as above thus allows for use of a smaller ABS electrical pump motor, which most likely provides for lower cost. Furthermore, a stable pump performance, as secured by the elevated voltage, provides for easier calibration of the functions that depend on the safety-critical actuator 4, 5 in question.

Furthermore, in order to ensure a fast alternator 3 response the control signal should originate directly from the safety-critical actuator 4, 5, and not from a separate control unit which thus does not need to know when the raised voltage is required. The signaling should thus be directly from the safety-critical actuator 4, 5, via e.g., a high-speed vehicle network bus or separate dedicated wiring, on to the alternator 3, which in turn should be provided with means responsive to this signaling to output a raised voltage for a pre-determined time period.

In case of a normal, so called 12 volt, vehicle electrical system it has been found beneficial if the alternator is arranged to output a voltage of approximately 15 V for the pre-determined time period.

As described above, the safety-critical actuator 4, 5 in one alternative embodiment is either of an at least partially electrically operated vehicle braking system 4 or vehicle steering system 5.

In a further embodiment the arrangement 1 comprises means 10 for establishing relative motion parameters between objects, such as vehicles/objects/lane markings/road signs, in front of the host vehicle 2. These means 10 may comprise at least one of a RADAR system, a LIDAR system, an ultrasound sensor system, a camera based system arranged to monitor the region in front of the host vehicle 2, or a system for wireless communication with the second vehicle/object (and/or any other object in the traffic environment), such as e.g., a system for telemetry, or a positioning system such as a GPS system (Global Positioning System).

These means 10 may be arranged to affect the safety-critical vehicle actuators 4, 5 in what is usually called a forward collision avoidance system (FCAS) why this denomination will be used in the following. Situations when a raised voltage to safety-critical actuators 4, 5 may be desirable is if e.g., a forward collision avoidance system or the like indicates a risk of an imminent collision which may be avoided or mitigated by braking or steering.

Thus, in one embodiment the arrangement 1 is responsive to activation of the safety-critical actuator 4, 5 by a vehicle mounted forward collision avoidance system 10. The vehicle mounted forward collision avoidance system 10 may further be arranged to trigger signaling to the alternator 3 in response to a predicted threat potentially requiring imminent activation of the safety-critical actuator 4, 5. Such functionality is primarily desirable when such a collision threat is predicted in order to support the safety-critical actuators 4, 5 which must perform optimally during such situations. A respective function or algorithm, such as a FCAS algorithm, of the forward collision avoidance system monitors the road ahead and predicts threats and monitors the threat level and signals to the alternator 3 to raise the voltage when such a threat level which may require operation of safety critical actuators 4, 5 is predicted. Furthermore, the vehicle mounted forward collision avoidance system 10 may further be arranged to trigger a warning to a driver of the vehicle to activate the safety-critical actuator 4, 5, e.g., a warning that it is time to apply the brakes and/or perform a steering maneuver in order to avoid a collision.

Figure 2:
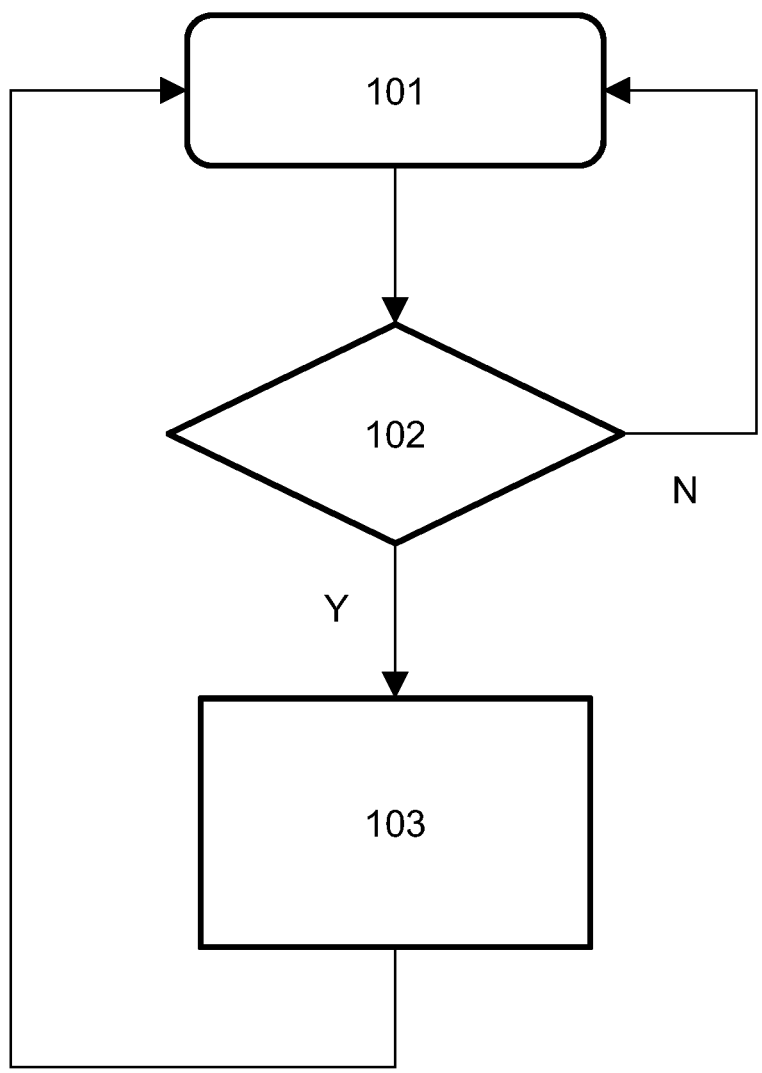
FIG. 2 is a flow chart illustrating one embodiment of method for improving the performance of a safety-critical vehicle actuator in accordance with the present application.

A method for improving the performance of a safety-critical vehicle actuator, in particular a safety-critical vehicle actuator powered directly or indirectly from a vehicle electrical system, is also provided herein. The method, as illustrated in FIG. 2, comprises the step of: arranging the safety-critical vehicle actuator 4, 5 to, upon activation thereof, signal to an alternator 3 of the vehicle to output a raised voltage for a pre-determined time period.

Once the method is initiated at step 101, in step 102 is determined if a safety-critical actuator 4, 5 is activated or not. If determined in step 102 that a safety-critical actuator 4, 5 has not been activated the method remains in a waiting mode. On the other hand, once determined in step 102 that a safety-critical actuator 4, 5 has been activated, the activated safety-critical actuator 4, 5 signals to an alternator 3 of the vehicle to output a raised voltage for a predetermined time period in step 103. Once the predetermined time period has elapsed the method loops back to step 101 and returns to the waiting and monitoring mode.

How to achieve rising of the output voltage of an alternator 3 is well known to a person skilled in the art. An example is using an alternator having a secondary magnetization winding which may be magnetized selectively for causing the alternator to generate an elevated output voltage, as described above.

In accordance with the present application is also envisaged a vehicle comprising an arrangement 1 as described above.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. An arrangement for a vehicle, the arrangement comprising:
   a vehicle electrical system including an alternator; and
   a safety vehicle actuator powered directly or indirectly from the vehicle electrical system, wherein the safety vehicle actuator, upon activation thereof, is configured to signal directly to the alternator to output a raised voltage for a pre-determined time period.

2. The arrangement according to claim 1 wherein the alternator is configured to output the raised voltage within 300 milliseconds from receipt of said signal.

3. The arrangement according to claim 2 wherein the alternator is configured to output the raised voltage at a level of approximately 15 volts for the pre-determined time period.

4. The arrangement according to claim 1 wherein the safety vehicle actuator is either of an at least partially electrically operated vehicle braking system or an at least partially electrically operated vehicle steering system.

5. The arrangement according to claim 1 wherein the arrangement is configured to be responsive to activation of the safety vehicle actuator by a vehicle mounted forward collision avoidance system.

6. The arrangement according to claim 1 further comprising a vehicle mountable forward collision avoidance system configured to activate the safety vehicle actuator.

7. The arrangement according to claim 6 wherein the vehicle mountable forward collision avoidance system further is configured to trigger signaling to the alternator in response to a predicted threat potentially requiring imminent activation of the safety vehicle actuator.

8. The arrangement according to claim 7 wherein the vehicle mountable forward collision avoidance system is further configured to trigger a warning to a driver of the vehicle to activate the safety vehicle actuator.

9. A method for improving performance of a safety vehicle actuator powered directly or indirectly from a vehicle electrical system, the method comprising:
   arranging the safety vehicle actuator to, upon activation thereof, signal directly to an alternator of the vehicle to output a raised voltage for a pre-determined time period.

10. A vehicle comprising:
    an electrical system including an alternator; and
    a safety vehicle actuator powered directly or indirectly from the electrical system, wherein the safety vehicle actuator, upon activation thereof, is configured to signal directly to the alternator to output a raised voltage for a pre-determined time period.

11. The vehicle according to claim 10 wherein the alternator is configured to output the raised voltage within 300 milliseconds from receipt of said signal.

12. The vehicle according to claim 11 wherein the alternator is configured to output the raised voltage at a level of approximately 15 volts for the pre-determined time period.

13. The vehicle according to claim 10 wherein the safety vehicle actuator is either an at least partially electrically operated vehicle braking system or an at least partially electrically operated vehicle steering system.

14. The vehicle according to claim 10 further comprising a forward collision avoidance system configured to activate the safety vehicle actuator.

15. The vehicle according to claim 14 wherein the forward collision avoidance system is further configured to trigger signaling to the alternator in response to a predicted threat potentially requiring imminent activation of the safety vehicle actuator.

16. The vehicle according to claim 15 wherein the forward collision avoidance system is further configured to trigger a warning to a driver of the vehicle to activate the safety vehicle actuator.

17. The arrangement according to claim 1 wherein the alternator comprises a magnetization winding, the winding magnetized selectively for causing the alternator to output the raised voltage.

18. The method according to claim 9 wherein the alternator comprises a magnetization winding, the winding magnetized selectively for causing the alternator to output the raised voltage.

19. The vehicle according to claim 10 wherein the alternator comprises a magnetization winding, the winding magnetized selectively for causing the alternator to output the raised voltage.

20. The vehicle according to claim 10 wherein the alternator is configured to output a first voltage lower than the raised voltage during normal operation.

* * * * *